United States Patent
Bae et al.

(10) Patent No.: US 9,873,242 B2
(45) Date of Patent: Jan. 23, 2018

(54) METHOD FOR PREPARING CONTINUOUS CARBON FIBER-REINFORCED THERMOPLASTIC PREPREG

(71) Applicants: POSCO, Pohang-Si, Gyeongsangbuk-Do (KR); RESEARCH INSTITUTE OF INDUSTRIAL SCIENCE & TECHNOLOGY, Pohang-si, Kyungsangbook-do (KR)

(72) Inventors: Il-Joon Bae, Pohang-si (KR); Ik-Pyo Hong, Pohang-si (KR); Sei-Min Park, Pohang-si (KR); Sung-Young Lee, Pohang-si (KR)

(73) Assignees: POSCO, Pohang-si, Gyeongsangbuk-Do (KR); RESEARCH INSTITUTE OF INDUSTRIAL SCIENCE & TECHNOLOGY, Pohang-si, Gyeongsangbuk-Do (KR)

( * ) Notice: Subject to any disclaimer, the term of this patent is extended or adjusted under 35 U.S.C. 154(b) by 325 days.

(21) Appl. No.: 14/654,835

(22) PCT Filed: Dec. 24, 2013

(86) PCT No.: PCT/KR2013/012144
§ 371 (c)(1),
(2) Date: Jun. 22, 2015

(87) PCT Pub. No.: WO2014/104730
PCT Pub. Date: Jul. 3, 2014

(65) Prior Publication Data
US 2015/0336369 A1 Nov. 26, 2015

(30) Foreign Application Priority Data
Dec. 27, 2012 (KR) .......................... 10-2012-0154591

(51) Int. Cl.
*B29C 65/14* (2006.01)
*B32B 37/06* (2006.01)
(Continued)

(52) U.S. Cl.
CPC ...... *B32B 38/1808* (2013.01); *B29C 65/1425* (2013.01); *B29C 70/506* (2013.01);
(Continued)

(58) Field of Classification Search
CPC ... B29C 65/1425; B29C 70/506; B32B 37/06; B32B 2260/021; B32B 2260/046;
(Continued)

(56) References Cited

U.S. PATENT DOCUMENTS 8,043,669 B2 * 10/2011 Ohno .......................... C08J 5/04
252/511
8,044,505 B2 * 10/2011 Hosomi .................... B32B 5/26
257/635
(Continued)

FOREIGN PATENT DOCUMENTS

CN 101500798 A 8/2009
CN 101511919 A 8/2009
(Continued)

OTHER PUBLICATIONS

Japanese Office Action issued in Japanese Application No. 2015-549278 dated Jul. 26, 2016, with English Translation.
(Continued)

*Primary Examiner* — Michael A Tolin
(74) *Attorney, Agent, or Firm* — McDermott Will & Emery LLP

(57) ABSTRACT

The present invention relates to a method for preparing a continuous carbon fiber-reinforced thermoplastic prepreg, and more specifically, to a method for preparing a continuous carbon fiber-reinforced thermoplastic semi-prepreg or
(Continued)

prepreg, comprising the steps of: providing a plurality of carbon fibers having an increased width; preparing a layered product by arranging a thermoplastic film on at least a part of the upper and lower portions of the carbon fibers having an increased width; and preparing a joined product by joining the thermoplastic film and the carbon fibers comprising the layered body.

8 Claims, 9 Drawing Sheets

(51) Int. Cl.
| | | |
|---|---|---|
| *C08J 5/24* | (2006.01) | |
| *B32B 38/18* | (2006.01) | |
| *B32B 38/00* | (2006.01) | |
| *B32B 37/04* | (2006.01) | |
| *B32B 27/08* | (2006.01) | |
| *B29C 70/50* | (2006.01) | |
| *B29K 307/04* | (2006.01) | |
| *B29K 105/08* | (2006.01) | |

(52) U.S. Cl.
CPC .............. *B32B 27/08* (2013.01); *B32B 37/04* (2013.01); *B32B 37/06* (2013.01); *B32B 38/0012* (2013.01); *C08J 5/24* (2013.01); *B29K 2105/0872* (2013.01); *B29K 2105/0881* (2013.01); *B29K 2307/04* (2013.01); *B32B 2260/021* (2013.01); *B32B 2260/046* (2013.01); *B32B 2262/106* (2013.01); *B32B 2305/076* (2013.01); *B32B 2305/20* (2013.01); *B32B 2305/74* (2013.01); *B32B 2309/02* (2013.01); *B32B 2309/12* (2013.01); *B32B 2310/0806* (2013.01); *B32B 2310/0825* (2013.01); *B32B 2310/0862* (2013.01); *B32B 2313/04* (2013.01); *C08J 2300/22* (2013.01); *C08J 2323/12* (2013.01); *C08J 2367/02* (2013.01); *C08J 2371/00* (2013.01); *C08J 2377/00* (2013.01)

(58) Field of Classification Search
CPC ........ B32B 2262/106; B32B 2305/076; B32B 2310/0825; B32B 2310/0862; B29K 2105/0872; B29K 2105/0881; B29K 2105/089; C08J 5/24; C08J 2300/22; C08J 2323/12; C08J 2367/02; C08J 2371/00; C08J 2377/00
See application file for complete search history.

(56) References Cited

U.S. PATENT DOCUMENTS

| | | | |
|---|---|---|---|
| 2007/0126142 A1* | 6/2007 | Zhou | ..................... B29C 70/521 264/134 |
| 2007/0292674 A1 | 12/2007 | Morin | |
| 2010/0059719 A1 | 3/2010 | Ohno | |
| 2010/0291342 A1 | 11/2010 | Jung et al. | |
| 2011/0076441 A1 | 3/2011 | Gruenert et al. | |
| 2013/0270736 A1 | 10/2013 | Kim et al. | |

FOREIGN PATENT DOCUMENTS

| | | | |
|---|---|---|---|
| CN | 102029719 A | | 4/2011 |
| CN | 102196895 A | | 9/2011 |
| EP | 2 080 781 A1 | | 7/2009 |
| EP | 2 338 667 A2 | | 6/2011 |
| JP | 58-31716 A | | 2/1983 |
| JP | S58-29651 A | | 2/1983 |
| JP | 58162317 A | * | 9/1983 |
| JP | S58-162317 A | | 9/1983 |
| JP | S59-014924 A | | 1/1984 |
| JP | 64-34723 A | | 2/1989 |
| JP | 4-33808 A | | 2/1992 |
| JP | 05-162125 A | * | 6/1993 |
| JP | H05-162125 A | | 6/1993 |
| JP | 10-163603 A | | 6/1998 |
| JP | 2003-165851 A | | 6/2003 |
| JP | 2011-073436 A | | 4/2011 |
| JP | 2011-148146 A | | 8/2011 |
| JP | 2012-506477 A | | 3/2012 |
| JP | 2012-246442 A | | 12/2012 |
| KR | 10-2010-0044391 A | | 4/2010 |
| KR | 10-2012-0056027 A | | 6/2012 |
| KR | 10-2012-0090780 A | | 8/2012 |
| WO | 01/24993 A1 | | 4/2001 |
| WO | 2004/073948 A2 | | 9/2004 |
| WO | 2008/056755 A1 | | 5/2008 |

OTHER PUBLICATIONS

International Search Report issued in corresponding International Patent Application No. PCT/KR2013/012144, dated Mar. 31, 2014; 4 pages with English translation.

Extended European Search Report issued in corresponding European Patent Application No. 13868399.0, dated Jan. 20, 2016.

First Office Action issued in corresponding Chinese Patent Application No. 2013800684194, dated Feb. 26, 2016, with English translation.

* cited by examiner

FIG. 8A [ASTM D790 FLEXURAL PROPERTIES TESTER]

FIG. 8B [ASTM D790 FLEXURAL PROPERTIES TEST SAMPLES]

METHOD FOR PREPARING CONTINUOUS CARBON FIBER-REINFORCED THERMOPLASTIC PREPREG

RELATED APPLICATIONS

This application is the U.S. National Phase under 35 U.S.C. § 371 of International Patent Application No. PCT/KR2013/012144, filed on Dec. 24, 2013, which in turn claims the benefit of Korean Patent Application No. 10-2012-0154591, filed on Dec. 27, 2012, the disclosures of which Applications are incorporated by reference herein.

TECHNICAL FIELD

The present disclosure relates to a method for manufacturing a continuous carbon fiber reinforced thermoplastic prepreg, and more particularly, to a method for manufacturing a continuous carbon fiber reinforced thermoplastic prepreg by disposing a carbon fiber layer between a plurality of layers of thermoplastic film and bonding the carbon fiber layer and the layers of thermoplastic film to each other instead of directly impregnating the carbon fiber with melted thermoplastic resin.

BACKGROUND ART

Generally, continuous carbon fiber reinforced thermoplastics are formed by continuously embedding a reinforcing fiber such as a glass fiber or a carbon fiber in a plastic having a relatively low degree of mechanical strength. Such continuous carbon fiber reinforced thermoplastics have very high degrees of mechanical strength, rigidity, and impact resistance, as compared to short fiber reinforced thermoplastics (SFTs) having reinforcing fibers contained therein having a fiber length of 1 mm or shorter or long fiber reinforced thermoplastics (LFTs) having a fiber length of about 5 mm to about 50 mm, such as glass mat-reinforced thermoplastics (GMTs).

In addition, since continuous carbon fiber reinforced thermoplastics have high degrees of flexibility, continuous carbon fiber reinforced thermoplastics can be unidirectionally or bidirectionally woven, and woven continuous carbon fiber reinforced thermoplastic materials can be used in many products requiring various mechanical properties.

Generally, continuous carbon fiber reinforced thermoplastics may be manufactured by methods such as a pultrusion method or a commingling or hot pressing method.

In a pultrusion method, a continuous fiber tow is impregnated with a plastic resin by spreading the continuous fiber tow out widely and passing the widely spread continuous fiber tow through a bath or die containing a liquid or melted resin. Although the degree of impregnation may be increased by optimizing process conditions of a pultrusion process, it is difficult to control the amount of a reinforcing fiber such as a continuous fiber and the amount of a plastic resin being mixed, and continuous fibers processed by the pultrusion method may not be easily woven due to having a low degree of flexibility.

Furthermore, if a heating method of the related art is used, films may be melted from surfaces thereof, and thus the films may be easily bent on the melted surfaces.

Therefore, it is necessary to provide a method for manufacturing a continuous carbon fiber reinforced thermoplastic prepreg without the above-mentioned problems, to allow the method to be usefully used in related fields.

DISCLOSURE

Technical Problem

An aspect of the present disclosure may provide a method for manufacturing a high-strength continuous carbon fiber reinforced thermoplastic prepreg using a film and a widely spread carbon fiber tow through a repeated stacking process, a fusing process, and an impregnating process including micro-impregnation without performing an impregnating process in which highly viscous melted thermoplastic resin pellets are used. According to the manufacturing method of the present disclosure, although the carbon fiber tow includes a large number of filaments (for example, 12K, 24K, or 48K filaments), the carbon fiber tow may be highly impregnated with a resin, and the volume fraction of a continuous carbon fiber in the continuous carbon fiber reinforced thermoplastic prepreg may be maximized. In addition, the continuous carbon fiber reinforced thermoplastic prepreg may be easily manufactured while reducing the formation of voids.

Technical Solution

According to an aspect of the present disclosure, a method for manufacturing a continuous carbon fiber reinforced thermoplastic prepreg may include: preparing widely spread filaments of carbon fiber; forming a stack by disposing a thermoplastic film on at least a portion of upper and lower sides of the widely spread filaments of carbon fiber; and forming a bonded material by bonding the thermoplastic film and the carbon fiber of the stack.

The forming of the bonded material may be performed by radiating microwaves.

The forming of the bonded material may be performed within a temperature range of 100° C. to 450° C. by using at least one heat source selected from the group consisting of halogen lamps and infrared lamps.

The widely spread filaments of carbon fiber may be arranged at regular intervals.

The preparing of the widely spread filaments of carbon fiber may include coating the filaments of carbon fiber with a bonding resin having a melting point lower than that of the thermoplastic film.

The thermoplastic film may be formed of a material selected from the group consisting of polypropylene (PP), polyamide (PA), polyetheretherketone (PEEK), and polyethyleneterephthalate (PET).

The thermoplastic film may have a thickness of 10 μm to 100 μm.

The method may further include pressing the bonded material by using a pair of rollers under a vacuum or atmospheric pressure conditions.

The pressing of the bonded material may be performed within a temperature range of 100° C. to 450° C.

The method may further include: heating the bonded material; and additionally pressing the bonded material by using a pair of rollers under a vacuum or atmospheric pressure conditions.

The heating of the bonded material may be performed within a temperature range of 100° C. to 450° C.

The additional pressing of the bonded material may be performed within a temperature range of 100° C. to 450° C.

The heating of the bonded material may be performed using at least one heat source selected from the group consisting of halogen lamps and infrared lamps.

The stack may be formed by stacking thermoplastic films and disposing the carbon fiber between the thermoplastic films.

Advantageous Effects

According to the manufacturing method of the present disclosure, after a continuous carbon fiber reinforced thermoplastic prepreg (tape containing a continuous carbon fiber) impregnated with or containing a thermoplastic resin film is unidirectionally arranged or bi-axially arranged (0° and 90°), an additional resin impregnating process is not necessary. In addition, after unidirectionally arranging or weaving a thermoplastic prepreg, the thermoplastic prepreg may be processed through a hot pressing process to obtain high-strength, lightweight continuous carbon fiber reinforced thermoplastic plates having various shapes. According to the present disclosure, a weaving process may be easily performed, and various kinds of thermoplastic films may be used, so as to manufacture a highly uniform continuous carbon fiber reinforced thermoplastic prepreg (or tape containing a continuous carbon fiber). In addition, carbon fiber reinforced thermoplastic products having a high degree of strength may be manufactured by maximizing impregnating a carbon fiber with a thermoplastic resin that is more viscous than thermosetting resins, minimizing the formation of voids, and maximizing the volume fraction of the carbon fiber.

BEST MODE

Embodiments of the present disclosure will now be described in detail with reference to the accompanying drawings. The disclosure may, however, be exemplified in many different forms and should not be construed as being limited to the specific embodiments set forth herein.

The present disclosure provides a method for manufacturing a continuous carbon fiber reinforced thermoplastic prepreg by disposing a carbon fiber on a side of a thermoplastic film or between a plurality of thermoplastic films and bonding the carbon fiber to the film(s) instead of directly impregnating a carbon fiber with a molted thermoplastic resin.

In detail, the manufacturing method of the present disclosure includes: a process of preparing widely spread filaments of carbon fiber; a process of forming a stack by disposing a thermoplastic film on at least a portion of upper and lower sides of the widely spread filaments of carbon fiber; and a process of forming a bonded material by continuously bonding the widely spread filaments of the carbon fiber to the thermoplastic film.

As described above, according to the present disclosure, a prepreg is prepared by bonding or fusing a continuous carbon fiber to a thermoplastic film, and in the present disclosure, the prepreg may be referred to as a "bonded material" or a "semi-prepreg." In addition, a final prepreg in which a carbon fiber is inserted into a thermoplastic film may be obtained by performing an additional process such as a pressing or heating process on such a "semi-prepreg."

For example, according to the present disclosure, a prepreg may be manufactured in the form of tape or a sheet.

Figure 1:
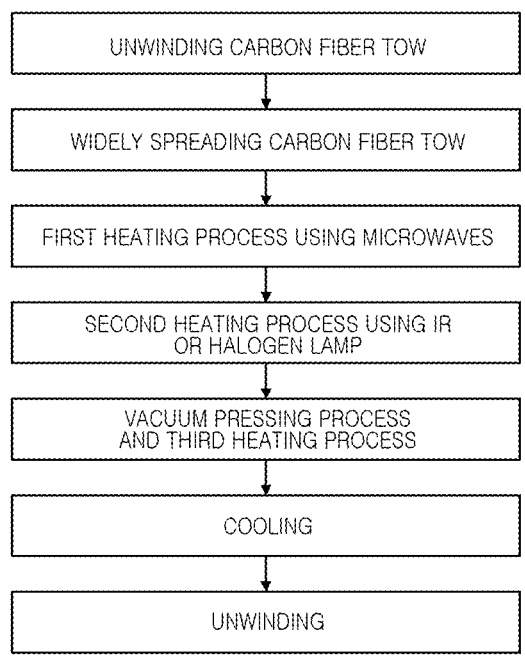
FIG. 1 is a flowchart illustrating a manufacturing method according to the present disclosure.

FIG. 1 is a flowchart schematically illustrating the manufacturing method of the present disclosure. Referring to FIG. 1, the process of preparing widely spread filaments of carbon fiber may include unwinding a carbon fiber tow and spreading the carbon fiber tow.

In more detail, a plurality of filaments of a continuous carbon fiber tow may be unwound along a carbon fiber unwinding roller and may then be uniformly spread along a plurality of spreading rollers so that the filaments of the continuous carbon fiber tow may be arranged (widened) at desired widthwise intervals.

For example, the filaments of the continuous carbon fiber tow may be spread by passing the filaments of the continuous carbon fiber tow through holes of a fiber separating machine so as to arrange the filaments of the continuous carbon fiber tow in one direction without tangling.

Figure 2A:
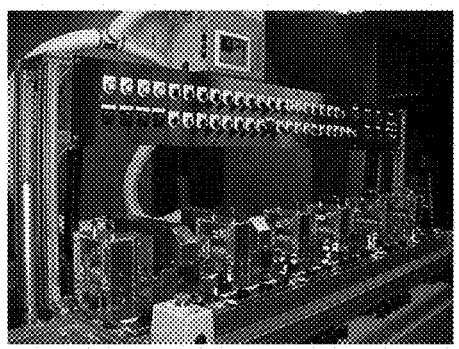
FIGS. 2A to 2C illustrate an exemplary carbon fiber spreading machine (by Harmoni Industry, Japan) that may be used in a process of preparing widely spread filaments of carbon fiber according to the present disclosure.
Figure 2B:
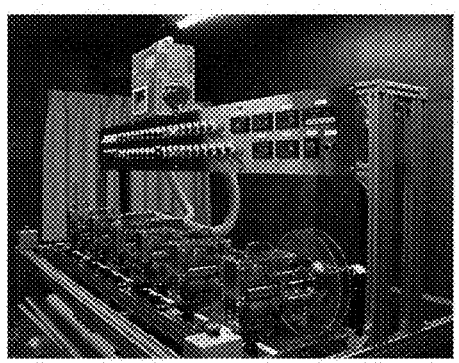
Figure 2C:
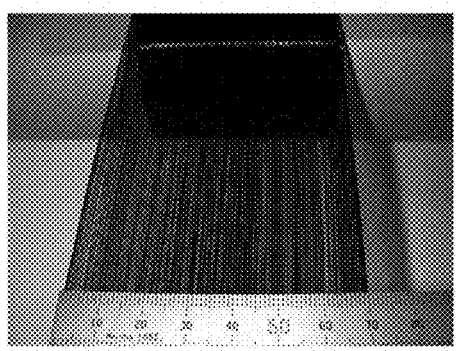

FIGS. 2A to 2C illustrate an exemplary carbon fiber spreading machine (by Harmoni Industry, Japan) that may be used in the process of preparing widely spread filaments of carbon fiber.

FIGS. 2A and 2B are right and left views of the exemplary carbon fiber spreading machine, and FIG. 2C is an image of a spread continuous carbon fiber tow. Preferably, a 12K carbon fiber tow (a bundle of 12,000 filaments having a diameter of 5 μm to 7 μm) may be spread to a width of about 5 mm to about 50 mm. A 24K carbon fiber tow (a bundle of 24,000 filaments having a diameter of 5 μm to 7 μm) may be spread to a width of about 5 mm to about 70 mm. A 48K carbon fiber tow (a bundle of 48,000 filaments having a diameter of 5 μm to 7 μm) may be spread to a width of about 5 mm to about 100 mm.

In a non-limiting example, filaments of carbon fiber may be widely spread at regular intervals. However, in another example, filaments of carbon fiber may be widely spread at irregular intervals. In addition, the widely spread filaments of carbon fiber may be unidirectionally arranged or may be arranged according to various weave patterns such as plain, twill, or satin so as to form woven fabrics.

Figure 3:
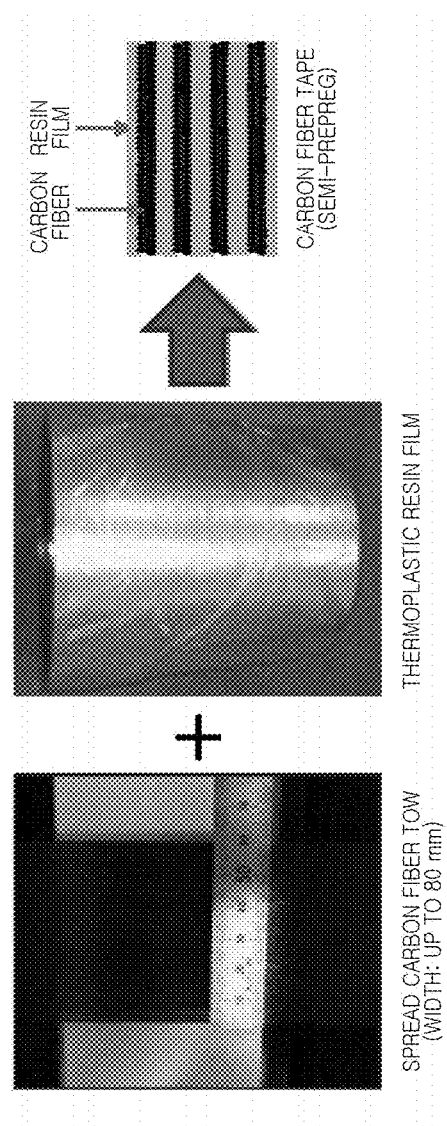
FIG. 3 illustrates an exemplary stack formed of a widely spread carbon fiber tow and a thermoplastic film according to the present disclosure.

A stack may be formed by disposing a thermoplastic film on at least a portion of upper and lower sides of the widely spread filaments of carbon fiber, and then a bonded material, that is, a semi-prepreg, may be formed by bonding the widely spread filaments of carbon fiber to the thermoplastic film. FIG. 3 illustrates an exemplary stack formed of a widely spread carbon fiber tow and a thermoplastic film according to the present disclosure.

The stack may basically include a thermoplastic film and a carbon fiber layer. For example, the stack may include a carbon fiber layer and thermoplastic films on upper and lower sides of the carbon fiber layer. In another example, the stack may include a thermoplastic film and carbon fiber layers on upper and lower sides of the thermoplastic film. In another example, the stack may have a combined structure of the above-mentioned structures.

Preferably, the thickness of the thermoplastic film may be within the range of 10 μm to 100 μm, more preferably within the range of 15 μm to 30 μm. If the thickness of the thermoplastic film is less than 10 μm, manufacturing costs may be increased, even in the case that the manufacturing processes may be performed without problems. On the contrary, if the thickness of the thermoplastic film is greater than 100 μm, it may be difficult to perform a uniform impregnating process.

The process of forming a bonded material may be performed using microwaves or at least one heat source selected from the group consisting of halogen lamps and infrared lamps in consideration of the melting points of a thermoplastic bonding layer and a resin film.

Microwaves may be radiated from a microwave device. If the stack is irradiated with microwaves, the carbon fiber may first absorb the microwaves and generate heat, and then a surface of the thermoplastic film making contact with the carbon fiber may be fused by the heat of the carbon fiber and stably bonded to the carbon fiber.

If a halogen lamp or an infrared lamp is used to form the bonded material, the contact surface between the thermoplastic film and the carbon fiber of the stack may be stably fused and bonded together.

In the process of preparing widely spread filaments of carbon fiber, the filaments of carbon fiber may be coated with a bonding resin having a melting point lower than that of the thermoplastic film. For example, the filaments of carbon fiber may be coated with a bonding resin selected from the group consisting of thermoplastic resins having melting points lower than a matrix resin that is used to impregnate the filaments of carbon fiber.

In this case, when the stack is formed by disposing the thermoplastic film on at least a portion of the widely spread filaments of carbon fiber, even though a heat source is not used, the thermoplastic film and the carbon fiber may be bonded together as a bonded material owing to the bonding resin.

The bonding resin is similar to an impregnation film resin in kind but melts at a relatively low temperature, as compared to the impregnation film resin. That is, the bonding resin may be any thermoplastic resin that melts before the impregnation film resin melts and bonds to the impregnation film.

The thermoplastic film may be formed of a material selected from the group consisting of polypropylene (PP), polyamide (PA), polyetheretherketone (PEEK), and polyethyleneterephthalate (PET). However, the thermoplastic film is not limited thereto.

The bonding resin may be a thermoplastic resin for low temperature use, such as a co-polyamide-based resin or a co-polyester-based resin.

As described above, in the present disclosure, a "semi-prepreg" or a "bonded material" refers to a material in which a carbon fiber and a thermoplastic film are bonded or fused together, and even in the case that the bonded material passes between hot pressing rollers in a later process, the stacked structure of the carbon fiber (tow) and the thermoplastic film may be maintained.

Thereafter, in an additional pressing process, the bonded material may be pressed using a pair of rollers under a vacuum or atmospheric pressure conditions so as to fuse the thermoplastic film and cause the fused thermoplastic film to permeate the carbon fiber. In this way, a prepreg may be prepared.

In this case, preferably, the pressing process may be performed within the temperature range of 100° C. to 450° C., more preferably within the temperature range of 150° C. to 300° C., according to the kind of a thermoplastic resin used to form the thermoplastic film, so as to easily fuse the thermoplastic film and cause the fused thermoplastic film to easily permeate the carbon fiber. If the pressing process is performed at a temperature lower than 100° C., the thermoplastic film may be insufficiently fused, and thus the carbon fiber may be insufficiently inserted into the thermoplastic film. On the contrary, if the pressing process is performed at a temperature higher than 450° C., the thermoplastic resin or the thermoplastic film may deteriorate or burn. That is, the process temperature of the pressing process may be optimally determined according to the kind of the thermoplastic resin or film.

In addition, after the pressing process is performed under a vacuum or atmospheric pressure conditions by using a pair of rollers, a heating process may be performed, and an additional pressing process may be performed under a vacuum or atmospheric pressure conditions using a pair of rollers so as to securely insert the carbon fiber into the thermoplastic film.

In this case, preferably, the heating process may be performed within the temperature range of 100° C. to 450° C. according to the kinds of the thermoplastic resin and the thermoplastic film, and the additional pressing process may be performed within the temperature range of 100° C. to 450° C. Within the above-mentioned process temperature range of the heating process, the heating process may be performed at a temperature higher than the process temperatures of the pressing processes performed before and after the heating process.

In other words, although the process temperature ranges of the heating process and the pressing processes are equal, the heating process is performed at a temperature higher than the process temperatures of the pressing processes. If such additional pressing processes are performed, bubbles may be easily and completely removed from the stack of the thermoplastic film and the widely spread filaments of carbon fiber by a pressing method. In addition, such bubbles may be more easily removed under vacuum conditions, and thus, the number of remaining bubbles may be minimized.

The heating process may be performed using at least one heat source selected from the group consisting of halogen lamps and infrared lamps. However, the heating process is not limited thereto.

Since the temperature of the carbon fiber increases during the above-described processes, the manufacturing method of the present disclosure may further include a natural cooling process to cool the carbon fiber at room temperature. In the cooling process, air may be blown. However, the natural cooling process is not limited thereto.

During the natural cooling process, a manufactured film or tape may be wound around a winding roll.

According to the method for manufacturing a continuous carbon fiber reinforced thermoplastic prepreg according to the present disclosure, a stack including a plurality of thermoplastic films and a carbon fiber layer disposed between the thermoplastic films or a stack including a plurality of carbon fiber layers and a thermoplastic film disposed between the carbon fiber layers may be formed. The stack may include thermoplastic films arranged in two or more layers and a carbon fiber layer disposed between the thermoplastic films.

Figure 4:
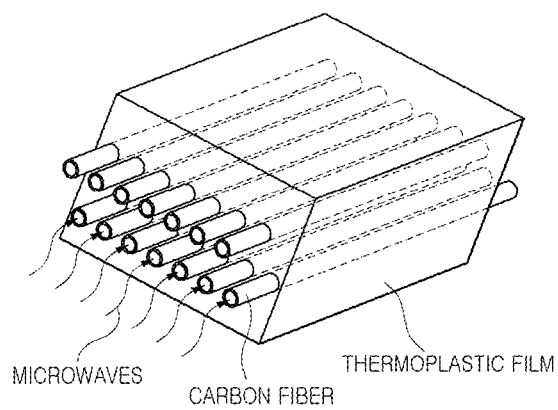
FIG. 4 is a schematic perspective view illustrating a carbon fiber reinforced thermoplastic film manufactured according to the present disclosure.

FIG. 4 illustrates an exemplary continuous carbon fiber reinforced thermoplastic prepreg including three layers of thermoplastic films and two carbon fiber layers pressed between the thermoplastic films.

According to the present disclosure, as illustrated in FIG. 1, the method for manufacturing a continuous carbon fiber reinforced thermoplastic prepreg may further include a process of winding the continuous carbon fiber reinforced thermoplastic prepreg while supporting the continuous carbon fiber reinforced thermoplastic prepreg using a tension roller.

Figure 5A:
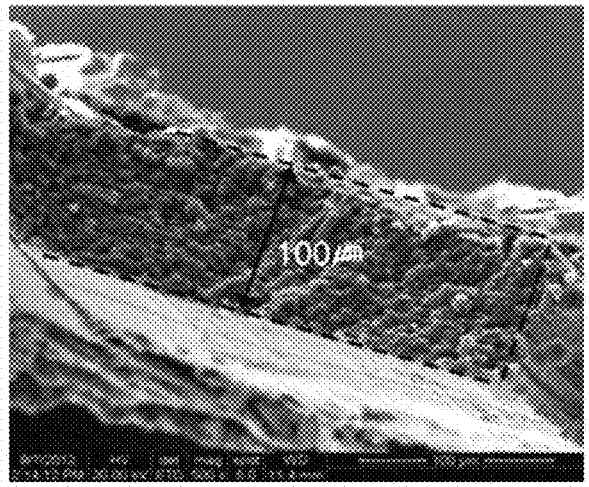
FIGS. 5A and 5B are different magnification images of a section of a continuous carbon fiber reinforced thermoplastic prepreg manufactured according to the present disclosure.
Figure 5B:
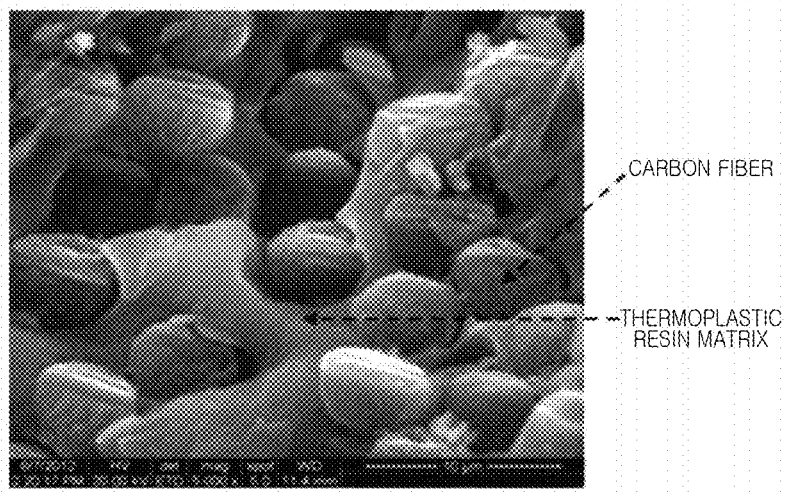

According to the manufacturing method of the present disclosure, a continuous carbon fiber reinforced thermoplastic prepreg or a final prepreg may manufactured in the form of tape and/or sheets having various thicknesses and widths, and the tape or sheets formed of the tape may be used as intermediate goods for manufacturing carbon fiber reinforced plastics (CFRPs). FIGS. 5A and 5B are different magnification images of a section of a continuous carbon fiber reinforced thermoplastic prepreg manufactured by the method of the present disclosure.

Generally, high-viscosity thermoplastic resins or melted resins for manufacturing films are excessively viscous, and thus it is difficult to smoothly impregnate 24,000 or 48,000 filaments of a 24K or 48K carbon fiber tow having a filament diameter of up to about 7 μm with such resins. Therefore, it is technically difficult to manufacture high-strength thermoplastic CFRPs by highly impregnating a continuous fiber with such resins.

However, according to the present disclosure, a semi-prepreg or prepreg may be manufactured by disposing a thermoplastic resin film having a thickness of 10 μm to 100 μm between widely spread carbon fiber tow layers having a thickness of several tens of micrometers (μm) and bonding the thermoplastic resin film and the carbon fiber tow layers. That is, in a hot pressing process for manufacturing a finally formed part, a carbon fiber tow may be maximally impregnated with a highly viscous melted resin while minimizing the flow of the highly viscous melted resin, so as to obtain a semi-prepreg or prepreg in the form of tape or sheets that are intermediate goods necessary for manufacturing high-strength CFRP products completely impregnated with a resin.

According to the method for manufacturing a continuous carbon fiber reinforced thermoplastic prepreg of the present disclosure, a carbon fiber may be used instead of general reinforcing fibers such as glass fibers, aramid fibers, ceramic fibers, metal fibers, and other organic, inorganic, or metal fibers.

Figure 6:
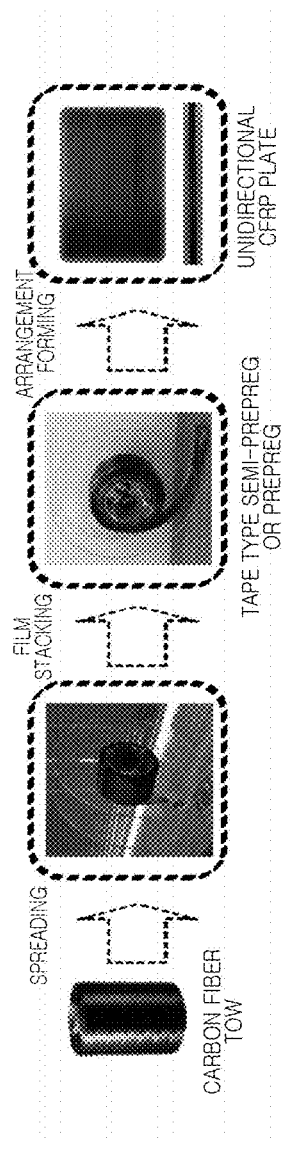
FIG. 6 illustrates exemplary processes for manufacturing a unidirectional carbon fiber reinforced thermoplastic (CFRTP) plate using a thermoplastic prepreg (tape containing a continuous carbon fiber) according to the present disclosure.

A prepreg obtained by the method of the present disclosure may be formed into a unidirectional carbon fiber reinforced thermoplastic (CFRTP) plate through exemplary processes illustrated in FIG. 6. In detail, after forming a semi-prepreg or prepreg by spreading a carbon fiber tow and bonding the spread carbon fiber tow to a thermoplastic film, a unidirectional CFRTP plate may be manufactured using the semi-prepreg or prepreg through an arrangement forming process.

In this case, the semi-prepreg or prepreg may be arranged according to various arrangement patterns such as a bi-axial pattern (0° and 90°) or a multi-axial pattern (45°, 90°, −45°, and 0°) so as to manufacture a CFRTP plate having required properties.

Figure 7:
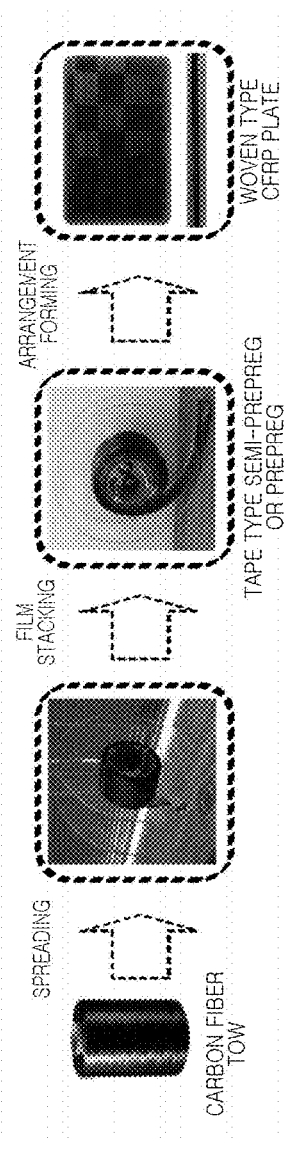
FIG. 7 illustrates exemplary processes for manufacturing a woven type CFRTP plate using a thermoplastic prepreg (tape containing a continuous carbon fiber) according to the present disclosure.

A prepreg obtained by the method of the present disclosure may be formed as a woven type CFRTP plate through exemplary processes as illustrated in FIG. 7. In detail, after forming a semi-prepreg by spreading a carbon fiber tow and bonding the spread carbon fiber tow to a thermoplastic film, a woven type CFRTP plate may be manufactured using the semi-prepreg through a weaving process. If necessary, various weave patterns such as plain, twill, or satin may be used to form the woven type CFRTP plate.

CFRTP plates manufactured using a prepreg of the present disclosure may have satisfactory flexural properties.

Hereinafter, the present disclosure will be described more specifically through examples. The following examples are for illustrative purposes only and are not intended to limit the scope and spirit of the present invention.

Mode for Invention

EXAMPLES

1. Manufacturing of CFRTP Plates

Continuous carbon fiber (CF) tape was formed of a widely spread/coated carbon fiber (CF) and a thermoplastic resin film through stacking, fusing, and impregnating processes, and the continuous CF tape was arranged in layers within a 100 mm×180 mm steel die. Then, the steel die was heated to 270° C. to fuse the thermoplastic resin film and to thus bond layers of the continuous CF tape together, and unidirectional CFRTP plate samples were formed of the CF tape through a hot pressing process by applying a pressure of up to 10 MPa to the CF tape and cooling the CF tape.

2. Evaluation of Flexural Properties

Figure 8:
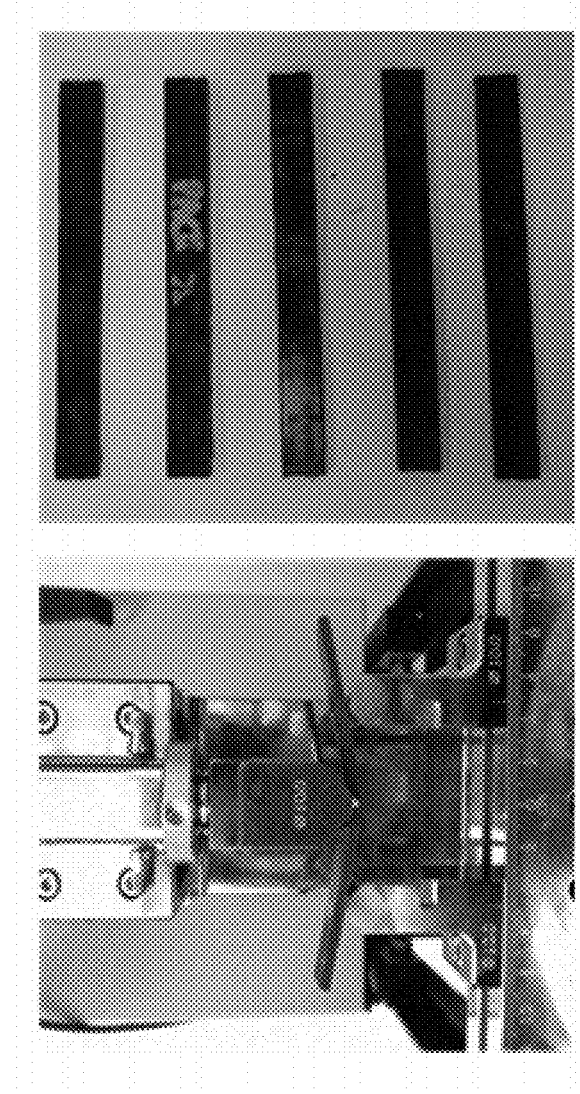
FIGS. 8A and 8B illustrate a flexural properties tester and samples used in a flexural properties test.

CFRTP plates fabricated as described in the aforementioned section 1 were cut into shapes having dimensions of 12.7 mm (w)×127 mm (d) as illustrated in FIG. 8B, and flexural properties of the CFRTP samples were measured by a standard measuring method stated in ASTM D790 by using a flexural properties tester (Instron UTM 5569A) as illustrated in FIG. 8A.

Figure 9:
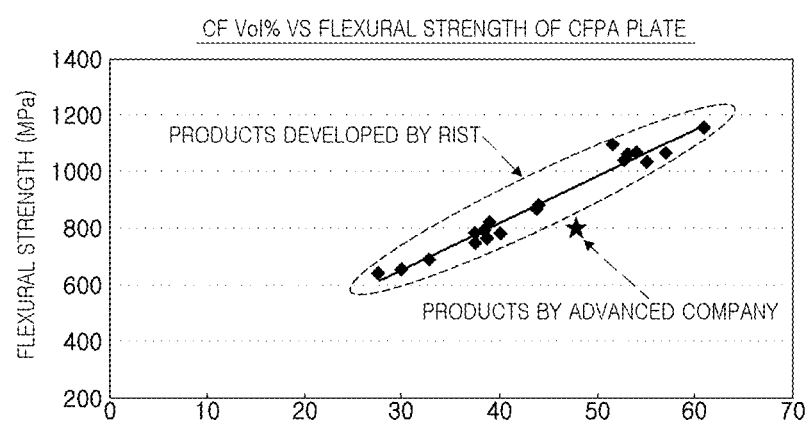
FIG. 9 illustrate results of a flexural properties test performed on unidirectional CFRTP plates manufactured using a thermoplastic prepreg of the present disclosure.

Measurement results are illustrated in the graph of FIG. 9. As illustrated in FIG. 9, CFRTP plates having various carbon fiber volume fractions (vol %) were fabricated by differently combining layers of a carbon fiber tow and a thermoplastic film, and the flexural strength values of the CFRTP plates were evaluated. The carbon fiber volume fractions and flexural strength values of the CFRTP plates had a linear proportional relationship.

When CFRTP plates having the same CF vol % were compared, the flexural strength of the CFRTP plates of the present disclosure was greater than that of a PA6 composite having a carbon fiber in an amount of 48 vol % (product name: Celstran CFT-TP PA6 CF60-01) of a company in the related art (Ticona) by 100 MPa or greater.

That is, according to the present disclosure, CFRTPs having satisfactory properties may be manufactured while reducing the content of relatively expensive carbon fiber compared to the PA6 composite product having a carbon fiber (CF) content of 48 vol %.

3. Analysis of Microstructure

Figure 10:
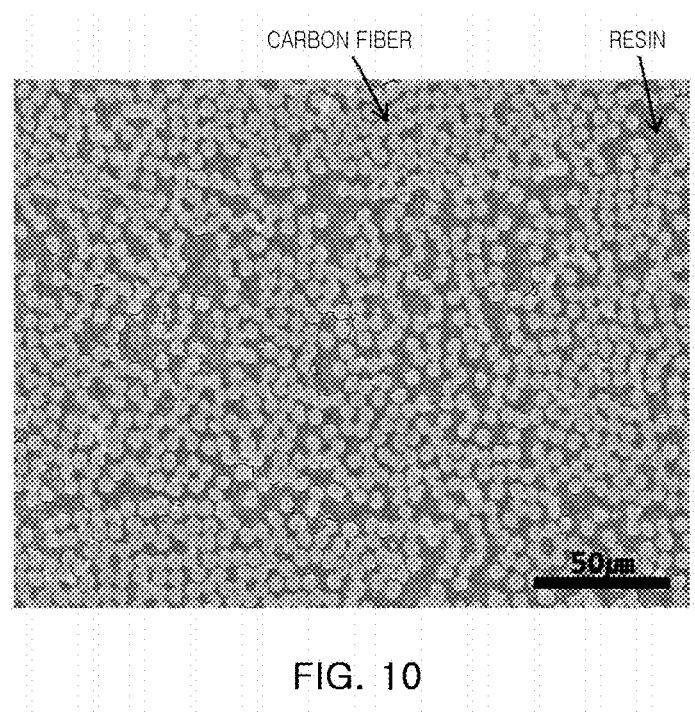
FIG. 10 is a scanning electron microscope (SEM) image of a section of an exemplary plate manufactured according to the present disclosure.

FIG. 10 is a scanning electron microscope (SEM) image of a section of an exemplary plate manufactured according to the present disclosure.

While exemplary embodiments have been shown and described above, it will be apparent to those skilled in the art that modifications and variations could be made without departing from the spirit and scope of the present invention as defined by the appended claims.

The invention claimed is:

1. A method for preparing a continuous carbon fiber reinforced thermoplastic prepreg, the method comprising:
   preparing widely spread filaments of carbon fiber;
   forming a stack by disposing a thermoplastic film on at least one side of upper and lower sides of the widely spread filaments of carbon fiber; and
   forming a bonded material by bonding the thermoplastic film and the carbon fiber of the stack by radiating microwaves,
   wherein the preparing of the widely spread filaments of carbon fiber comprises coating the filaments of carbon fiber with a bonding resin having a melting point lower than that of the thermoplastic film.

2. The method of claim 1, wherein the widely spread filaments of carbon fiber are arranged at regular intervals.

3. The method of claim 1, wherein the thermoplastic film is formed of a material selected from the group consisting of polypropylene (PP), polyamide (PA), polyetheretherketone (PEEK), and polyethyleneterephthalate (PET).

4. The method of claim 1, wherein the thermoplastic film has a thickness of 10 µm to 100 µm.

5. The method of claim 1, further comprising pressing the bonded material by using a pair of rollers under a vacuum or atmospheric pressure conditions.

6. The method of claim 5, after the pressing is performed, further comprising:
   heating the bonded material; and
   additionally pressing the bonded material by using a pair of rollers under a vacuum or atmospheric pressure conditions.

7. The method of claim 6, wherein the heating of the bonded material is performed using at least one heat source selected from the group consisting of halogen lamps and infrared lamps.

8. The method of claim 1, wherein forming a stack is performed by disposing a thermoplastic film on both upper and lower sides of the widely spread filaments of carbon fiber.

* * * * *